United States Patent [19]

Pritzkow et al.

[11] 4,405,863

[45] Sep. 20, 1983

[54] DETECTOR ARRAY RETAINING AND POSITIONING SYSTEM

[75] Inventors: Dennis H. Pritzkow, New Berlin; Jack H. Zabel, Milwaukee; George R. Lang, New Berlin, all of Wis.

[73] Assignee: General Electric Company, Schenectady, N.Y.

[21] Appl. No.: 312,557

[22] Filed: Oct. 19, 1981

[51] Int. Cl.$^3$ .......... G01T 1/18; H01J 1/88

[52] U.S. Cl. .......... 250/385; 313/243

[58] Field of Search .......... 250/374, 385; 313/243, 313/269, 281, 292, 304, 383, 390; 378/4

[56] References Cited

U.S. PATENT DOCUMENTS

| | | | |
|---|---|---|---|
| 3,366,790 | 1/1968 | Zagorites et al. | 250/385 |
| 3,638,062 | 1/1972 | Beggs | 313/269 |
| 4,056,727 | 11/1977 | Beyersdorf | 250/385 |
| 4,119,853 | 10/1978 | Shelley et al. | 250/385 |
| 4,161,655 | 7/1979 | Cotic et al. | 250/385 |
| 4,276,476 | 6/1981 | Cotic | 250/385 |

*Primary Examiner*—Janice A. Howell

*Attorney, Agent, or Firm*—Wheeler, House, Fuller & honenfeldt

[57] ABSTRACT

Improved end blocks for the electrode array of a multi-cell radiation detector support the array and isolate it from the interior walls of an enclosed ionization chamber. A plunger extends from the rear wall of each end block and is biased by a spring within the end block to bear against the rear wall of the detector chamber, biasing the electrode array forwardly against front spacers to position the front edges of the electrodes in equidistantly spaced relation to a x-ray transmissive window formed in the front wall of the detector housing. The bias exerted by the springs is adjustable. A tool is inserted into each end block during assembly of the detector to retract the plungers while the array is being positioned within the opened ionization chamber.

The invention greatly reduces noise in the detector caused by microphonics, thus improving the integrity of the detected signal and permitting shorter scanning times and other advantages.

9 Claims, 4 Drawing Figures

Fig. 1
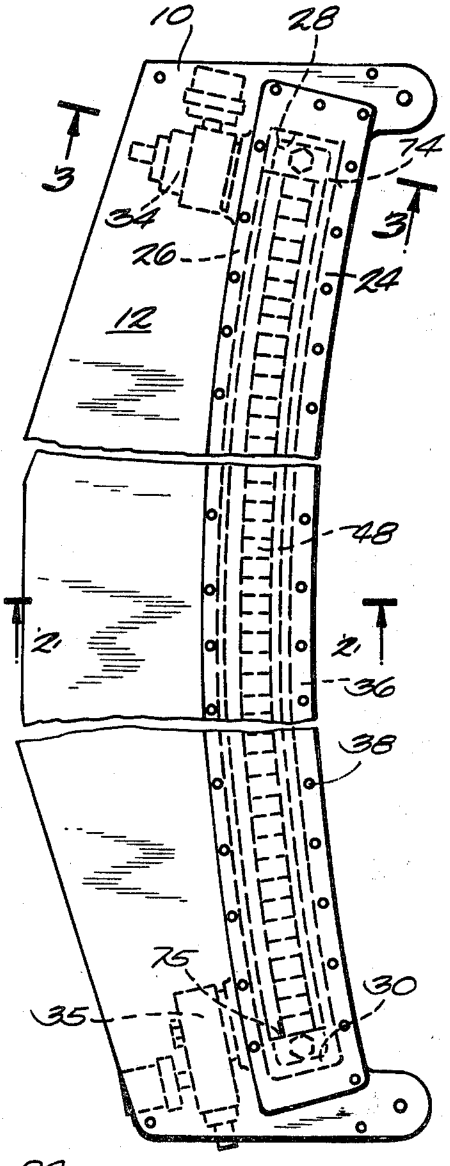
Fig. 2
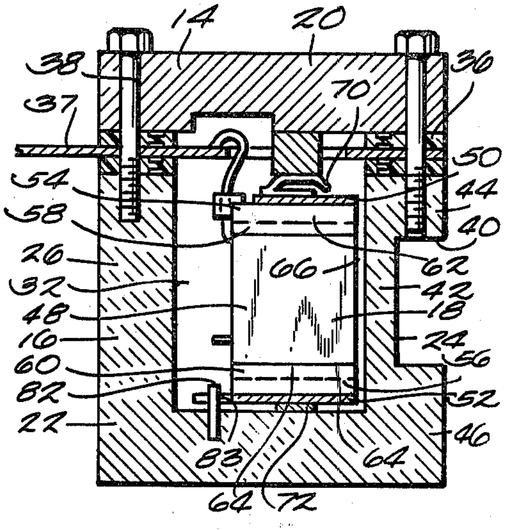
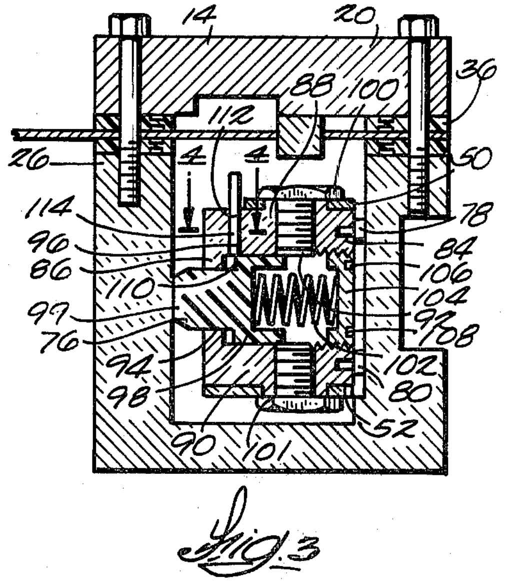
Fig. 3
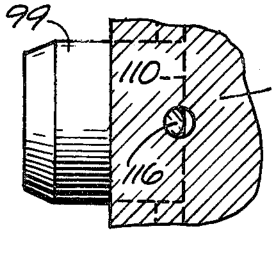
Fig. 4

DETECTOR ARRAY RETAINING AND POSITIONING SYSTEM

BACKGROUND OF THE INVENTION

This invention relates to detectors for ionizing radiation, particularly x-ray detectors used in computed axial tomography systems for medical diagnosis. Such detectors must detect x-ray photons efficiently and with a high degree of spatial resolution. In some computed axial tomography systems, the x-ray source is pulsed and the pulse repetition rate can be limited by the recovery time of the x-ray detectors. Optimized detectors for use in such systems will thus have fast recovery time, high sensitivity, and fine spatial resolution. In multicell detectors, the cells should each have identical and stable detecting characteristics.

Multicell detector arrays are shown in U.S. Pat. No. 4,119,853, issued to Shelley, et al. on Oct. 10, 1978, and U.S. Pat. No. 4,276,476, issued to Cotic on June 30, 1981. The detectors in the cited patents comprise a multiplicity of adjacent, slightly spaced apart electrode plates standing edgewise within a pressure vessel containing an ionizable gas. Ionization events can take place in the gas filled gaps between adjacent plates when ionizing radiation passes through a window in the pressure vessel and enters the gaps. Alternate electrode plates in the array are connected together and to a common potential source to provide bias electrodes. The remaining electrodes, called signal electrodes, have individual electrical leads connected to a data processing unit (typically a digital computer) to allow the potential between each signal electrode and the most nearly adjacent bias electrodes to be measured. The potential between any signal electrode and the bias electrodes is proportional to the instantaneous intensity of x-radiation in the space between adjacent bias electrodes of the array.

The electrode plates are positioned with their front edges in equally spaced relation to an x-ray transmissive window formed in the front wall of the chamber, and are disposed along regularly spaced radial lines extending from the source of radiation. To maintain this spacing and disposition the top and bottom edges of the plates are received in registered pairs of radial grooves formed in a pair of electrically insulating ceramic substrates, which in turn are bonded to the facing surfaces of a pair of curved frame members, typically stainless steel bars. End blocks secured between the bars at each end of the array complete the electrode array assembly. The end blocks are supported within the chamber to locate the array therein.

The described multicell detectors can be susceptible to high frequency mechanical vibrations known as microphonics. The electrode plates are made of extremely thin metal and are maintained close together and with a relatively large potential difference between them. Microphonics transmitted through the gas chamber to the electrode array affect the capacitance between adjacent electrodes and can introduce spurious signals which change the x-ray intensity measurements. In severe cases, microphonic noise can be comparable in intensity to the x-ray induced signal, thus significantly reducing the accuracy of the reconstructed image.

The cited art shows a detector array end block or post biased toward the front and bottom walls of the chamber by cantilevered finger springs. The bias is resisted by resilient spacers interposed between the array and the front and bottom walls of the chamber, providing a floating array which is securely supported within the chamber. Such a structure has considerably reduced the effects of microphonics on the detector, but further improvement is possible. The cantilevered springs for biasing the array toward the front wall of the chamber can exert a turning moment on the array. In addition, metal particles are sometimes scraped by the springs from the rear wall of the chamber during insertion of the prior art array in the chamber, and can seriously interfere with detector performance.

SUMMARY OF THE INVENTION

The object of the present invention is to provide an improved detector array retaining and positioning system which is easily located in the chamber during assembly and which further reduces the transmission of microphonics to the detector array. A plunger extending from the rear wall of each end block of the array bears against the rear wall of the chamber to bias the end blocks against the front wall of the chamber without introducing any substantial turning moment on the array. The spring means which bias the plunger are enclosed within the respective end blocks. Front spacers positioned between the front wall of each end block and the front wall of the chamber maintain each electrode of the array with its front edge spaced slightly from the x-ray transmissive window, defining a gap between the window and the front edge of each plate which is substantially equal for each detector electrode in the array. The bias of the spring can be adjusted to a predetermined value before the detector is assembled.

Tools can be introduced in each end block to retract the plungers while the array is being positioned within the chamber, allowing the array to be installed without scraping particles from the walls of the chamber. The tools can be removed when the array is in place, releasing the plungers and biasing the array into its desired position.

Compared to the prior art, the present invention decreases microphonics noise approximately three to four times. Reduced microphonics noise allows the detector to be more sensitive and to recover faster, permitting greater resolution and reduced scanning times.

BRIEF DESCRIPTION OF THE DRAWINGS

FIG. 1 is a transversely foreshortened plan view of the multicell detector, showing the electrode array and end blocks in phantom.

FIG. 2 is an enlarged radial cross-sectional view of the detector, taken along line 2—2 of FIG. 1.

FIG. 3 is an enlarged radial cross-sectional view of the detector, taken along line 3—3 of FIG. 1.

FIG. 4 is an enlarged fragmentary view of the detector, partly in cross-section, taken along line 4—4 of FIG. 3.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Multicell detector 10 comprises a housing 12 including a cover 14 bolted to a body 16 to enclose and support an array 18 of juxtaposed electrode elements. The cover and body are each a single aluminum extrusion, and are machined to provide an interior top wall 20, bottom wall 22, front wall 24, rear wall 26, and first and second end walls 28 and 30 enclosing a chamber 32. Chamber 32 can be evacuated through a purging valve 34 and then filled at fill valve and pressure transducer assembly 35 with an ionizable gas, typically xenon, at the elevated pressures required for detecting x-ray photons; a typical gas pressure is about 25 atmospheres. To prevent gas from leaking between cover 14 and body 16, seals 36 made of suitable material are sandwiched between cover 14 and printed wire board 37, and between board 37 and body 16 of the chamber housing, and the cover is secured to the body by bolts such as 38. The front wall 24 of the housing has a groove 40 machined into it to define a window 42 which is more transmissive to the radiation to be detected than the adjacent portions 44 and 46 of front wall 24. Window 42 is carefully machined so that its front and rear faces lie on the surfaces of concentric right cylinders having as their centers the source of radiation, typically the focal point of an x-ray tube (not shown).

Electrode array 18 comprises juxtaposed electrode elements such as 48 supported by a frame comprising curved stainless steel bars 50 and 52 to which similarly shaped plates 54 and 56 of a ceramic material are bonded using epoxy resin or bolted. The ceramic plates are milled to provide registered pairs of circumferentially spaced radially disposed grooves such as 58 and 60. The top and bottom edges (62 and 64) of each element 48 are bonded to the corresponding grooves with epoxy resin so that the front edge 66 of each electrode is equidistantly spaced from window 42 to define a uniform gap. The detector cells will not respond uniformly to incident radiation unless this gap is precisely maintained. The number and spacing of electrodes 48 is determined by the transverse width of the beam of radiation to be detected and the required and practical degree of resolution of the beam. In this embodiment, the bias electrodes are spaced about 48 mils (1.20 mm) apart at their front edges and about 49 mils (1.22 mm) apart at their rear edges. Each electrode is made of tungsten, and is about 6 mils (0.15 mm) thick.

Electrode array 18 is supported between top wall 20 and bottom wall 22 by a series of identical, circumferentially spaced finger springs 70 opposed by a bottom spacer 72; array 18 is positioned between front wall 24 and rear wall 26 by mounting means comprising first and second end blocks 74 and 75, each provided with a plunger 76 and resilient nonmetallic front spacers 78 and 80. Detector array 18 is located within chamber 32 by a pin 82 secured to bottom wall 22 to receive an aperture 83 in a rear portion of plate 52.

Each end block such as 74 has a front wall 84, a rear wall 86, a top wall 88, and a bottom wall 90 facing the corresponding walls of the chamber. A first bore 92 extends through front wall 84, a second bore 94 communicates with bore 92 and extends through rear wall 86, and a third bore 96 extends through top wall 88 and also communicates with first bore 92. End blocks 74 and 75 are each machined from a single block of molybdenum. Hex screws 100 and 101 pass through apertures bored in each end of bars 50 and 52 and are threadably attached to top and bottom walls 88 and 90 of the end blocks.

Plunger 76 comprises a body portion 98 captured for forward and rearward translation within first bore 92 and a head portion 99 for extending through second bore 94 to bear against rear wall 26 of chamber 32. Plunger 76 is molded or machined from DELRIN, a proprietary resinous self-lubricating bearing material sold by E. I. DuPont de Nemours & Co. Being softer than the aluminum walls of chamber 32, the DELRIN plunger cannot scratch the rear wall 26 of the chamber when the detector is being assembled. Spring means 102, captured between plunger body 98 and a disk 104 forming a part of front wall 84 of the end block, is a compression spring which causes plunger 76 to bear against rear wall 26, biasing the end block 74 forwardly. Disk 104 is threadably received in first bore 92 and can be advanced rearwardly or retracted forwardly, providing spring trim means to change the bias exerted by spring 102 on plunger 76. Spaced cavities 106 and 108 in the outer portion of disk 104 receive a spanner to allow the disk to be threaded to the desired position in first bore 92. In this embodiment, the bias of plunger 76 is about 10 pounds (44 Newtons).

Plunger 76 can be retracted forwardly within first bore 92 while array 18 is being installed within chamber 32. A shoulder 110, defining the point where body portion 98 and head portion 99 of plunger 76 are joined, intersects the path of generally cylindrical third bore 96 when the plunger is in its extended position (shown in FIGS. 3 and 4). The plunger can be retracted so that the front wall 112 of third bore 96 is in line with the surface of shoulder 110. To do this, a tool 114 having a cam portion 116 at its lower extremity can be inserted into third bore 96 so that cam 116 protrudes from the inside of the top wall 88 and engages shoulder 110. Tool 114 is then rotated 90° either way to retract shoulder 110 forwardly. Array 18 is then positioned within chamber 32, and tool 114 is returned to the position shown in FIGS. 3 and 4 and removed to release the plunger.

The other features of detector 10 are shown in the previously cited patents, which are hereby incorporated by reference.

I claim:

1. in a multicell radiation detector comprising:

a housing having top, bottom, front, and rear walls and first and second ends defining a chamber for being filled with a gas ionizable by x-rays, said front wall having an x-ray transmissive window;

an array of juxtaposed electrode elements mounted to a pair of frame members for being supported in transversely spaced relation within said chamber to define a multiplicity of adjacent ionization cells; and mounting means to mount said array between said front and rear walls with said cells opening toward said window and with the front edge of each said element substantially equidistantly spaced from said window to define a uniform, transversely extending gap between said forward edges and said window; improved mounting means comprising:

first and second end blocks interposed between and joined to said frame members to support the respective ends of said array, each end block having front, rear, top, and bottom walls respectively facing the front, rear, top, and bottom walls of said chamber;

a plunger extending from the rear wall of each said end block;

spring means to urge each plunger against the rear wall of said chamber, thereby biasing each end block toward the front wall of said chamber; and a front spacer positioned between the front wall of each said end block and the front wall of said chamber to maintain said gap.

2. The detector of claim 1, further comprising spring trim means for adjusting the bias of said spring means.

3. The detector of claim 1, wherein each said plunger comprises a body portion captured for forward and rearward translation within the corresponding end block and a head portion for bearing against the rear wall of said chamber.

4. The detector of claim 3, wherein said spring means is located within said end block and bears between said plunger body portion and said end block front wall.

5. The detector of claim 4, wherein said plunger body portion is captured within a first bore extending through the front wall of said spacer means and said plunger head extends rearwardly through a second bore extending through the rear wall of said spacer means.

6. The detector of claim 5, wherein said trim means is a threaded disk forwardly and rearwardly translatable within said first bore for adjusting the bias of said spring means.

7. The detector of claim 5, wherein each said plunger means includes a shoulder defining the division between said head portion and said body portion.

8. The detector of claim 7, wherein each said plunger means has a rearwardly advanced position for engaging said chamber rear wall and a forwardly retracted position wherein said plunger means and chamber rear wall are separated.

9. The detector of claim 8, wherein a third bore through the top wall of said end block communicates between the outside of said end block and said first bore, permitting application of a tool through said third bore to move said plunger to said forwardly retracted position.

* * * * *